UNITED STATES PATENT OFFICE.

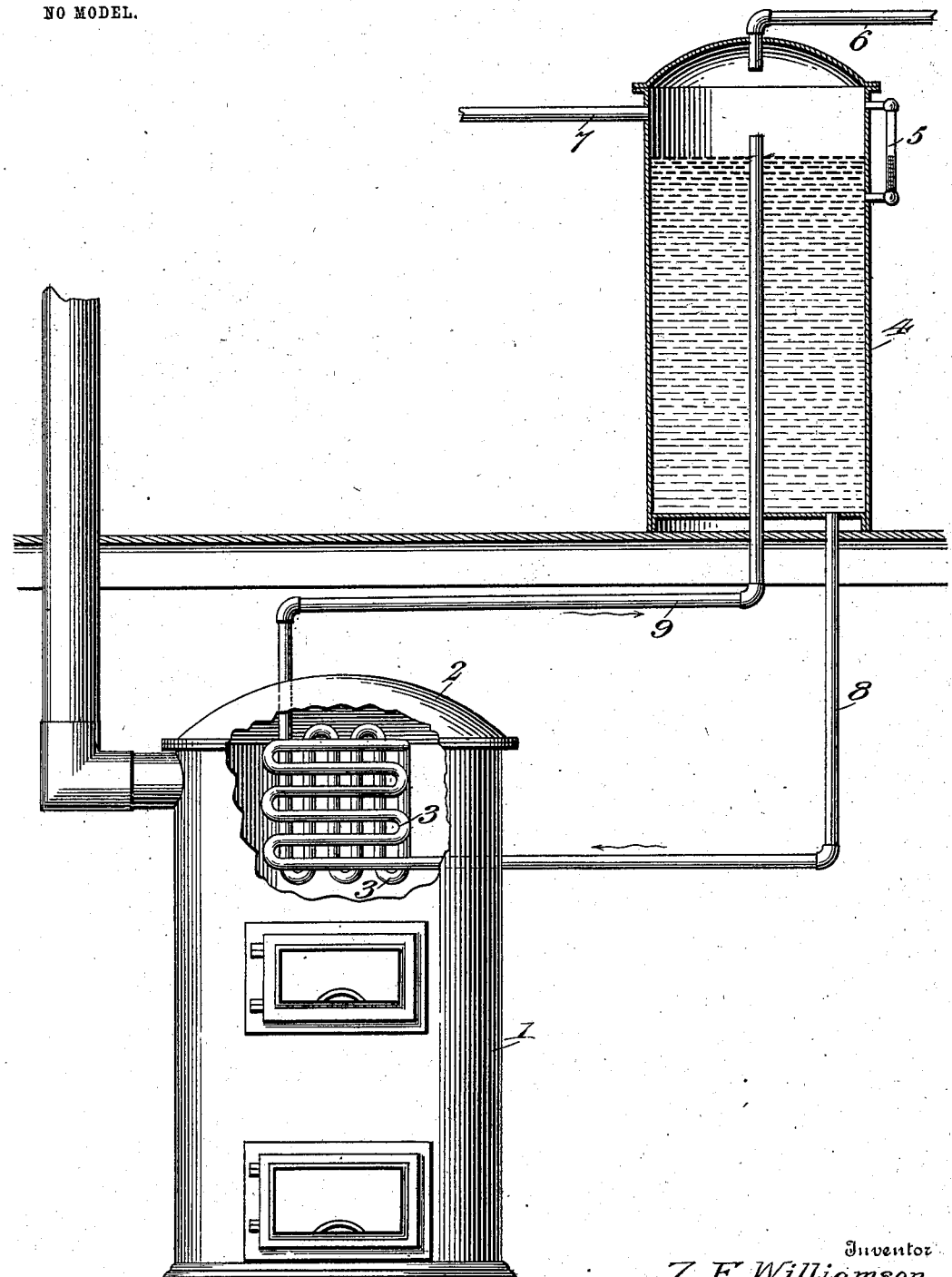

ZEPHANIAH E. WILLIAMSON, OF SHEFFIELD, ILLINOIS.

WATER-HEATER.

SPECIFICATION forming part of Letters Patent No. 726,834, dated April 28, 1903.

Application filed February 23, 1901. Serial No. 48,533. (No model.)

*To all whom it may concern:*

Be it known that I, ZEPHANIAH E. WILLIAMSON, a citizen of the United States, residing at Sheffield, in the county of Bureau and State of Illinois, have invented new and useful Improvements in Water-Heaters, of which the following is a specification.

This invention relates to new and useful improvements in water-heaters; and its primary object is to provide a novel apparatus which may be attached to a heating-furnace of ordinary construction and whereby water contained in a tank thereabove may be readily heated.

The apparatus is especially adapted for use in buildings dependent for their water-supply upon reservoirs or tanks located thereupon.

The invention consists in the novel construction and combination of parts hereinafter more fully described and claimed, and illustrated in the accompanying drawing, showing the preferred form of my invention, and which is a vertical section through the apparatus.

Referring to the drawing by numerals of reference, 1 is a furnace of ordinary construction, and in the combustion chamber or dome thereof is arranged a series of coils 3, composed of two adjacent portions standing in vertical planes, one portion of the series being composed of individual horizontal coils, the lower coil of which extends without the furnace to receive water to be heated, the other portion of the series having vertical individual coils, the last one of which is extended upwardly through the furnace and is designed to discharge the heated water.

Located at any suitable point above the furnace 1 is a tank 4, having a suitable water-gage 5 near the top thereof to indicate the amount of water within the tank. A feed-pipe 6 opens into the tank and conveys water thereto from a suitable force-pump. (Not shown.) An escape-pipe 7 is preferably arranged adjacent to the top of the tank, and this permits the escape of all steam which may be generated within the apparatus.

Opening into the tank 4 is a cold-water pipe 8, which communicates with the extended end of the lower horizontal coil, and a hot-water pipe 9 extends from the last vertically-extended coil of the vertical series of coils to discharge the heated water into the tank.

Water is forced into the tank 4 from a cistern or other supply and passes through the pipe 8, the vertical and horizontal coils, and into return-pipe 9. The weight of the water within the tank and the heat of the furnace will establish a circuit of water through the system, and it is obvious that the hot water discharged from pipe 9 will quickly displace the cold water drawn off through the pipe 8. Suitable pipes (not shown) may extend from the tank 4, and in this manner hot water may be distributed as desired.

By employing a pipe formed in parallel series of coils, the coils of one series extending transversely of the coils of the remaining series, a number of coils may be compactly arranged within an inclosure and the resistance to the passage of water therethrough decreased, whereby the water is heated more rapidly and thoroughly.

In the foregoing description I have shown what I believe the best form of invention; but I do not limit myself thereto, as I am aware that modifications may be made therein without departing from the spirit or sacrificing any advantages thereof, and therefore reserve the right to make all such changes as fairly fall within the scope of my invention.

I claim—

In a water-heating system, the combination with the furnace, of a series of coils in the combustion-chamber, said coils composed of two adjacent portions standing in vertical planes, one portion of the series composed of individual horizontal coils, the lower coil of which extends to without the furnace to receive water to be heated, the other portion of the series having vertical individual coils, the last one of which is extended upwardly through the furnace to discharge the heated water, substantially as specified.

In testimony whereof I affix my signature in presence of two witnesses.

ZEPHANIAH E. WILLIAMSON.

Witnesses:
F. G. LINDNER,
A. W. BOYDEN.